Dec. 22, 1970   J. T. HESS ET AL   3,548,623
METHOD AND APPARATUS FOR FORMING CIRCUMFERENTIAL
GROOVES AND RADIAL FLANGE IN METAL PIPE ENDS
Filed July 26, 1968                                2 Sheets-Sheet 1
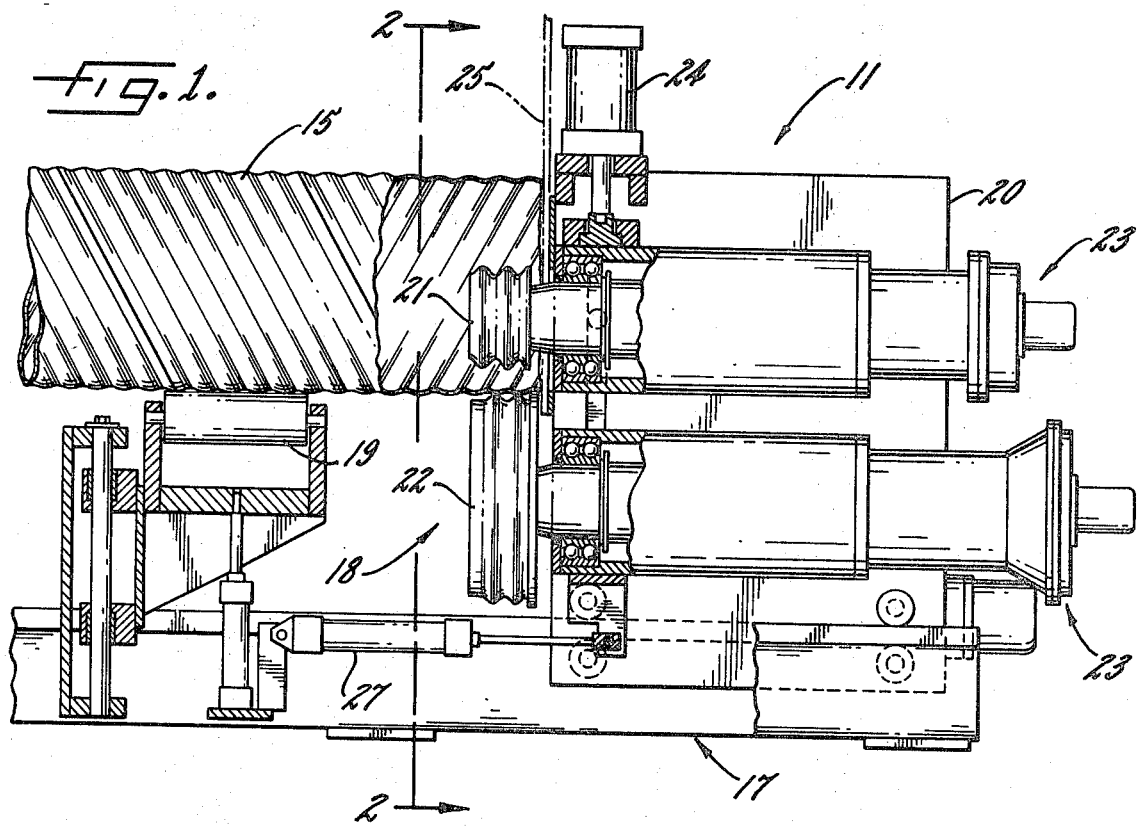
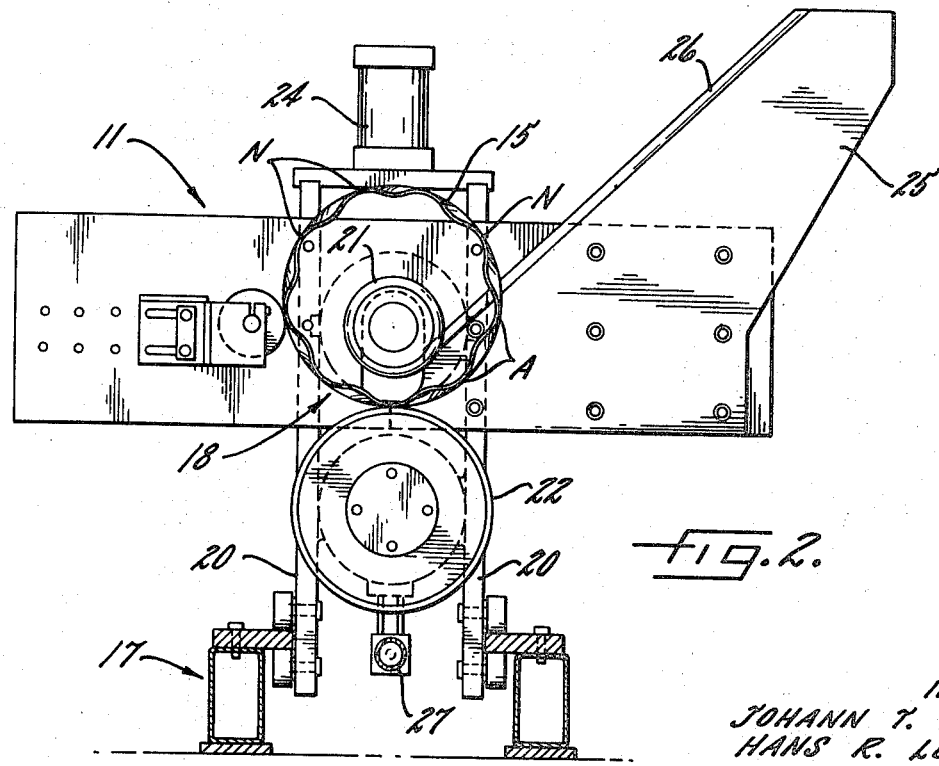
INVENTORS.
JOHANN T. HESS
HANS R. LUEDI
BY
Wolfe, Hubbard, Voit & Osann
ATTORNEYS.

INVENTORS.
JOHANN T. HESS
HANS R. LUEDI
BY Wolfe, Hubbard, Voit & Osann
ATTORNEYS.

United States Patent Office 3,548,623
Patented Dec. 22, 1970

---

3,548,623
METHOD AND APPARATUS FOR FORMING CIRCUMFERENTIAL GROOVES AND RADIAL FLANGE IN METAL PIPE ENDS
Johann T. Hess, Chicago, and Hans R. Luedi, Highland Park, Ill., assignors to Grotnes Machine Works, Inc., Chicago, Ill., a corporation of Illinois
Filed July 26, 1968, Ser. No. 747,987
Int. Cl. B21d *19/04*
U.S. Cl. 72—106                 5 Claims

ABSTRACT OF THE DISCLOSURE

Method and apparatus for roll forming circumferential grooves and a radial flange at the ends of spirally corrugated pipe wherein the pipe is positioned between the rollers which compress the pipe completely at the line of contact with the rollers and the desired deformation occurs in a single revolution of the pipe in the direction of advance of the spiral corrugations towards the rollers. Roll forming apparatus having dimensions such that abutment of no more than three high points of spirally corrugated pipe regardless of diameter against the plate results in an optimal and continuous radial flange.

---

The present invention relates generally to metal forming methods and apparatus and, more particularly, to methods and apparatus for roll forming circumferential grooves and a radial flange at the ends of tubular metal bodies having spiral corrugations. In its principal aspect, the invention is concerned with improved methods and apparatus for rolling tubular metal pipe having spiral corrugations so as to form circumferential grooves substantially perpendicular to the longitudinal axis of the pipe and an inwardly projecting flange at the pipe ends, while permitting various diameters and lengths of pipe to be so formed with a minimum of production time.

Corrugated metal pipes of the type with which the present invention finds especially advantageous use are formed, for example, by spirally winding a corrugated metal sheet and welding the abutting edges thereof. The resulting helical ends are then transversely cut-off with a cutting torch or the like. Consequently, the pipe ends are ordinarily not at right angles to the longitudinal axis of the pipe with the amount of such deviation varying with relatively wide limits.

When the corrugated pipe is used, lengths of pipe often must be joined end to end. One commonly used manner of joining such pipes involves molding an elastomeric sealing band around each of the ends to be joined and then securing a sleeve or coupling member around the adjoining pipe ends. Due to the problems faced with having to mold the sealing member in situ about the pipe end, other manners of joining the pipe were sought. One new proposed solution calls for enabling the use of conventional type O-rings used with a radially flanged coupling member. However, in order to utilize this solution satisfactorily, the necessity arose for providing circumferential grooves which are substantially perpendicular to the longi'udinal axis of the pipe as distinguished from the spiral corrugations already present.

Accordingly, it is a general aim of the present invention to provide methods and apparatus for forming circumferential grooves adjacent ends of tubular metal pipe having spiral corrugations, yet with the grooves formed being substantially perpendicular to the longitudinal axis of the pipe.

Another object of the invention is to provide methods and apparatus for circumferentially grooving metal pipe ends which permits mass production of the grooves on an economical basis. To this end, it is an object of the invention to provide forming methods and apparatus wherein both ends of spirally corrugated pipe can be grooved circumferentially by rapid and successive rolling operations performed thereon.

It is a further object to provide novel apparatus for forming circumferential grooves on spirally corrugated pipe ends which is characterized by its versatility and which can readily accommodate various diameter pipe without complex adaptation or long machine down times.

In another of its important aspects, it is an object of the invention to provide novel roll forming apparatus for grooving pipe ends which is capable of forming an otpimum sized inward radial flange about the entire periphery of the pipe end regardless of the wide variances in pipe diameter and absence of a right angled cut at the pipe end.

Other objects and advantages of the invention become apparent as the following description proceeds, taken in conjunction with the accompanying drawings, in which:

FIG. 1 is a fragmentary side elevation of one side of an exemplary roll forming apparatus embodying the features of the present invention, such apparatus here shown in partial section with the forming rolls opened and a pipe positioned thereon in readiness for a grooving operation in accordance with the invention;

FIG. 2 is a view taken substantially along the line 2—2 in FIG. 1;

While the invention is susceptible of various modifications and alternative forms, a specific embodiment thereof has been shown by way of example and will herein be described in detail. It should be understood, however, that it is not intended to limit the invention to the particular form disclosed, but, on the contrary, the intention is to cover all modifications, equivalents, and alternatives that fall within the spirit and scope of the invention as expressed in the appended claims.

Figure 6:
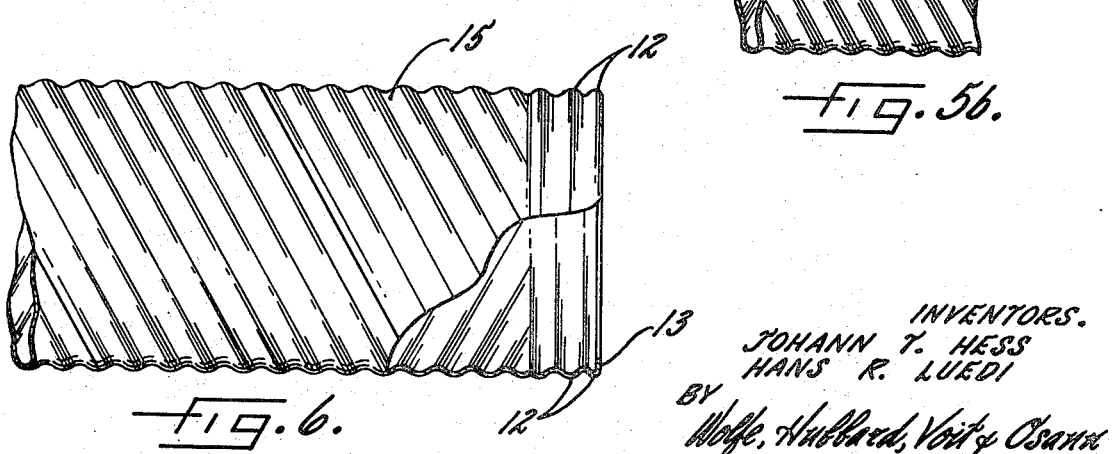
FIG. 6 is a fragmentary half section of one end of a completed product made in accordance with the present invention.

Referring now to the drawings, there is illustrated in FIGS. 1 and 2, an exemplary roll forming apparatus generally indicated at 11, which is particularly suited for forming circumferential grooves 12 and an inward radial flange 13 (FIG. 6) adjacent the end of a spirally corrugated pipe 15, in accordance with the present invention. In the illustrative form of the invention, the roll forming apparatus 11, only one side of which is shown, includes a relatively long fixed base 17 on which is mounted an axially reciprocable rolling mechanism 18 and a pipe support colum 19. The rolling mechanism includes an upright frame 20 which carries an upper roller 21 and lower roller 22 which cooperate to circumferentially deform metal pipe 15 compressed therebetween upon rotation of the rollers by a suitable drive unit 23. A compression mechanism including fluid actuator 24 serves to lower the upper roller 21 into cooperating relationship with lower roller 22, exert the proper desired pressure upon the pipe between the rollers and return the upper roller to a raised position after the rolling operation is completed. As shown in FIG. 1, the exemplary rollers 21 and 22 have corresponding peripheral ridges and cavities so as to form a pair of circumferential grooves and inward radial flange in a pipe end.

In order to insure that a pipe end inserted between the rollers 21, 22 is located sufficiently inward with respect to the rollers so that the radial flange formed is continuous regardless of the fact that the pipe end is not at a right angle to the pipe axis, there is provided a guide plate 25 (FIG. 2) secured to frame 20 behind the rollers. As here shown, the guide plate 25 is a generally elongated, polygonal shaped member which extends upwardly and outwardly from the rollers. A beveled edge 26 formed on guide plate 25 faces in opposition to the direction of rotation of the upper roller 21 and the pipe being rolled to insure that any pipe edge extending slightly beyond the guide plate does not bind or hinder the rotation of the pipe during the rolling operation.

In carrying out the present invention, the roller 21 is urged downwardly after the pipe end is inserted between roller 21, 22, until there is completed compression or bottoming of the roller 21 and the pipe is rotated through one complete revolution effecting the formation of the circumferential grooves in the pipe end. With spirally corrugated pipe as herein shown, the direction of rotation of the pipe must be such that the spiral corrugations "advance" or screw towards the roller mechanism working on the pipe. Thus, those skilled in the art will appreciate that a roller mechanism performing the operation on the opposite end of the pipe is identical to roller mechanism 18, only turned 180° so that the two roller mechanisms face one another.

Figure 3:
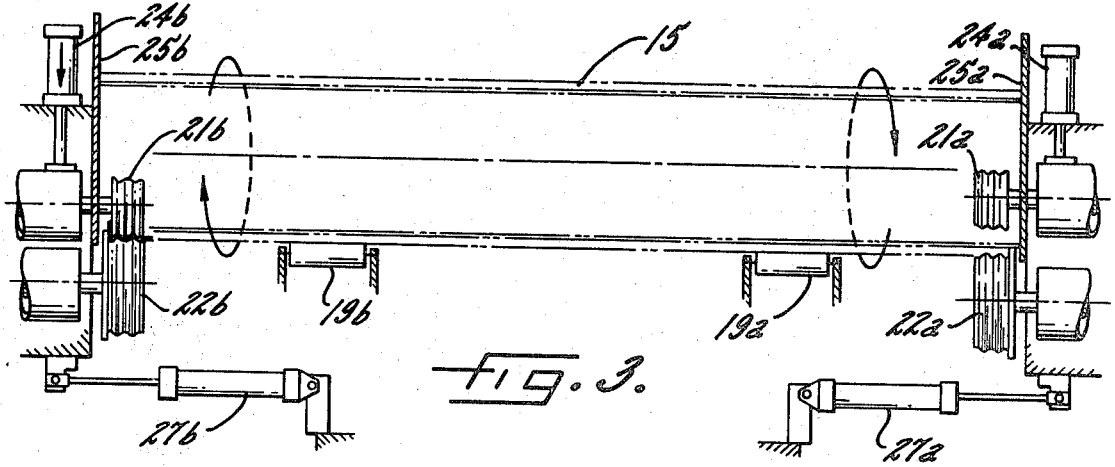
FIG. 3 is a schematic representation of forming rolls of a pair of spaced oppositely oriented roll forming apparatus such as shown in FIG. 1, depicting the grooving operation performed on opposite ends of a pipe in accordance with the present invention.

In keeping with the invention, both ends of the pipe are grooved circumferentially by rapid and successive rolling operations. To this end, referring to FIG. 3, there is depicted diagrammatically, the manner in which the pipe ends are rolled in accordance with the present invention. Thus, at the inception of the rolling operation pipe 15 is supported between spaced rolling mechanisms 18a, 18b which are then advanced by suitable shifting actuators 27a, 27b towards the pipe until its ends abut respective guide plates 25a, 25b. At this time, the upper roller 21a at the right hand end of the pipe is bottomed and the pipe is rotated through one complete revolution in the direction of advance of the spiral corrugations toward the right hand roller mechanism, as view in FIG. 3. After one complete revolution of the pipe, the right hand end of pipe 15 is completed, roller 21a is returned to a raised position and the roller mechanisms 18a, 18b are again advanced toward the pipe until the left hand pipe end again abuts against guide plate 25b. Now, upper roller 21b is lowered until it is bottomed and the pipe is rotated in an opposite direction for advancing the spiral corrugations toward the left hand roller mechanism as viewed in FIG. 3. After one complete revolution, the left hand end of pipe 15 is completed, roller 22b is raised, and roller mechanisms 18a, 18b are retracted away from the pipe to permit removal thereof and readiness for the next pipe.

Figures 4, 5A, 5B:
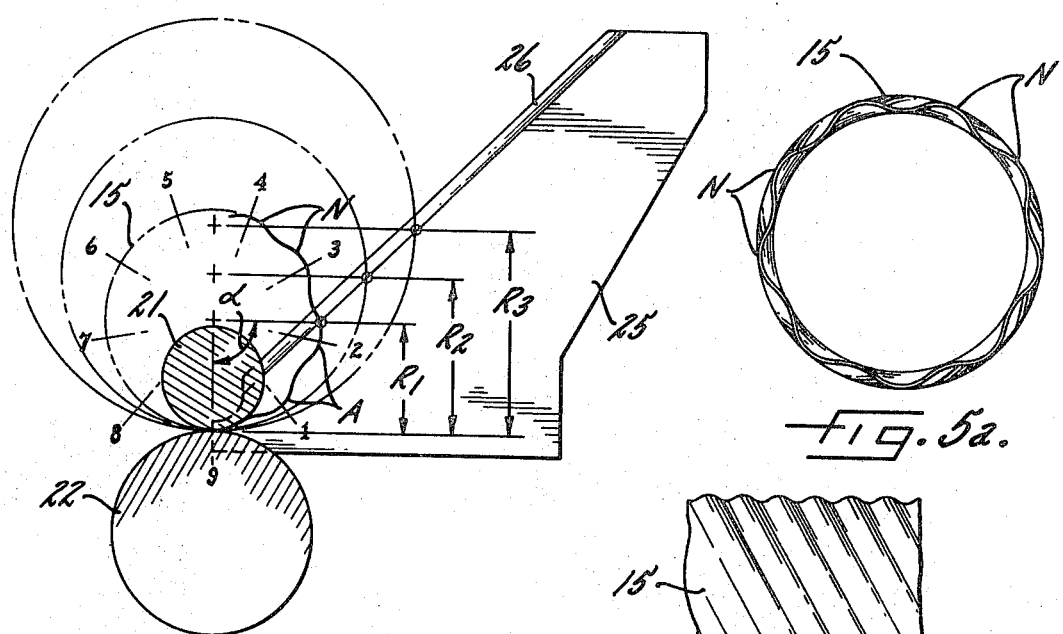
FIG. 4 is a diagrammatic front end view of a portion of the apparatus of FIG. 1, depicting the apparatus guide plate of the present invention and manner of its accommodating various diameter pipe even though the pipe ends are not precisely right angled.
FIGS. 5a and 5b are end and side views, respectively, of a spirally corrugated tubular metal product of the type with which the present invention is utilized.

In order to further emphasize the ability of the present invention to accommodate a wide range of pipe diameters, attention is directed to FIG. 4 where there is depicted diagrammatically a plurality of different sized pipe having radii $R_1$, $R_2$, $R_3$, $R_4$ as they would appear positioned between rollers 21, 22 of the present rolling mechanism.

In the preferred form of the invention, we have discovered that in order to insure the formation of radial flange 13 completely about the pipe end and at the same time optimizing the width of such flange formed, guide plate 24 may be so dimensioned that it will enable simply abutting any of a number of widely different diameter pipe in the machine and yet achieving the desired result with each pipe. Merely by way of example, it is to be noted that a typical spirally corrugated pipe, FIGS. 5a, 5b that has been manufactured by winding a corrugated sheet having a total of 9 ridges results in a pipe end having 9 high points N regardless of the diameter of the pipe formed by the winding operation. As can be seen by reference to FIG. 5b, the end 28 of pipe 15 exemplifies a rough cut typically occurring after the helical waste is removed by a cutting torch or the like.

In the practice of the present invention it has been found that the spirally corrugated pipe must be held against the guide plate 25 so that no less than approximately 2 nor more than approximately 3 high points N on the pipe contact the plate 25. Thus, the angle α (FIG. 4) or angle which defines the peripheral extent of a pipe having a radius $R_1$, $R_2$, $R_3$ or $R_4$ opposite the guide plate such that the proper number of high points N on the pipe end contact the guide plate may be set forth by the following equation:

$$(I) \qquad \alpha = \frac{360°}{N} \times A$$

where

N = the number of high points on the pipe end; and
A = No. of high points in contact with the guide plate.

In order to insure the desired optimum conditions, A is preferably given in accordance with the equation:

$$(II) \qquad 2 \leq A \geq 3$$

Tests have demonstrated that with pipe having 9 high points N at its ends and the angle of contact between the pipe being rolled and the guide plate is approximately 80° to 120° so that 2 to 3 high points of the pipe abut the plate 25 regardless of the pipe diameter, an optimal and continuous radially inward flange 13 is always produced.

We claim as our invention:

1. The method of roll forming circumferential grooves and radial inwardly extending flange adjacent an end of a spirally corrugated pipe comprising the steps of placing the end of said pipe between a pair of forming rolls, abutting the end of said pipe against guide means so that no more than three high points of said pipe contact said guide means, compressing said rolls to completely deform said pipe end at the line of contact with said rolls into the desired shape and rotating said pipe through one complete rotation in a direction of advance of said spiral corrugations toward the guide means.

2. The method of roll forming circumferential grooves and radial inwardly extending flange at the end of a spirally corrugated pipe having end high points comprising the steps of placing a first end of said pipe between a first pair of forming rolls, abutting the first end of said pipe against guide means so that no more than three high points of said pipe contact said guide means, compressing said roll to completely deform said pipe at the line of contact with said rolls into the desired shape, rotating the pipe through one complete revolution in a direction of advance of said spiral corrugations toward said first rollers guide means, placing the second end of said pipe between a second pair of forming rolls, abutting the second end of said pipe against guide means so that no more than three high points of said pipe contact said guide means, compressing said second rolls to completely deform said second pipe and at the line of contact with said second rolls into the desired shape and rotating the pipe in the opposite direction through one complete revolution.

3. Apparatus for roll forming a spirally corrugated pipe having a plurality of high points at its end, comprising in combination, a frame, first and second forming rolls carried by said frame, means for compressing said rolls, means for rotating said rolls to deform the pipe end disposed therebetween and a guide means interposed between said rolls and said frame, said guide means being dimensioned such that no less than approximately 2 nor more than approximately 3 high points contact said guide means when a pipe is inserted between said rolls.

4. Apparatus for forming circumferential grooves in a radially inward extending flange at the end of a spirally corrugated pipe having a plurality of high points at its end including a frame, a pair of cooperating forming rolls carried by said frame, means for compressing said rolls to completely deform the pipe end disposed therebetween, means for rotating the rolls and pipe through a single revolution, characterized by a guide means interposed between said rolls and said frame, said guide means extending outwardly and upwardly from said rolls and being dimensioned such that abutment of no more than three of said high points at the end of a pipe to be deformed by said rollers against said guide means insures production of a continuous optimal radial flange at the pipe end.

5. Aparatus as claimed in claim 4 wherein the guide means comprises a plate and the peripheral extent of a pipe in contact with the guide plate is determined in accordance with the equation (I) $$\alpha = \frac{360°}{N} \times A$$

where
- $\alpha$ equals the angle defining the peripheral portion of the pipe contacting plate;
- N equals the member of high points on the pipe end;
- A equals the number of high points contacting the guide plate; and A is in accordance with the equation;

(II) $$2 \leq A \geq 3$$

References Cited

UNITED STATES PATENTS

| | | | |
|---|---|---|---|
| 79,735 | 7/1868 | De Witt | 72—105 |
| 487,529 | 12/1892 | Holdship | 72—105 |

LOWELL A. LARSON, Primary Examiner